(12) United States Patent
Galtier et al.

(10) Patent No.: US 7,752,900 B2
(45) Date of Patent: Jul. 13, 2010

(54) METHOD FOR DETECTING A MISFIRE AND CORRESPONDING DEVICE

(75) Inventors: Frédéric Galtier, Montpellier (FR); Damien Roussel, Endoufielle (FR)

(73) Assignee: Continental Automotive France, Toulouse (FR)

( * ) Notice: Subject to any disclaimer, the term of this patent is extended or adjusted under 35 U.S.C. 154(b) by 18 days.

(21) Appl. No.: 12/306,110

(22) PCT Filed: Jun. 4, 2007

(86) PCT No.: PCT/EP2007/004933

§ 371 (c)(1),
(2), (4) Date: Dec. 22, 2008

(87) PCT Pub. No.: WO2007/147484

PCT Pub. Date: Dec. 27, 2007

(65) Prior Publication Data
US 2009/0229354 A1    Sep. 17, 2009

(30) Foreign Application Priority Data
Jun. 21, 2006    (FR) .................................. 06 05526

(51) Int. Cl.
*G01M 15/11*    (2006.01)
(52) U.S. Cl. .................................................. 73/114.02
(58) Field of Classification Search .. 73/114.02–114.05
See application file for complete search history.

(56) References Cited

U.S. PATENT DOCUMENTS

| 5,044,194 A |   | 9/1991 | James et al. |
|---|---|---|---|
| 5,377,537 A | * | 1/1995 | James ...................... 73/114.04 |
| 5,379,634 A | * | 1/1995 | Kuroda et al. ............. 73/114.04 |
| 5,387,253 A |   | 2/1995 | Remboski, Jr. et al. |
| 5,670,713 A |   | 9/1997 | Machida et al. |
| 5,753,804 A | * | 5/1998 | La Palm et al. .......... 73/114.04 |
| 5,893,897 A |   | 4/1999 | Volkart et al. |
| 5,906,652 A |   | 5/1999 | Remboski et al. |

(Continued)

FOREIGN PATENT DOCUMENTS

DE    4138765    7/1992

(Continued)

OTHER PUBLICATIONS

International search report in corresponding PCT/EP2007/004933.

*Primary Examiner*—Lisa M Caputo
*Assistant Examiner*—Freddie Kirkland, III
(74) *Attorney, Agent, or Firm*—Young & Thompson

(57) ABSTRACT

Method of detecting a misfire in an internal combustion engine provided with at least two cylinders and a crankshaft, includes:

Figure 1:
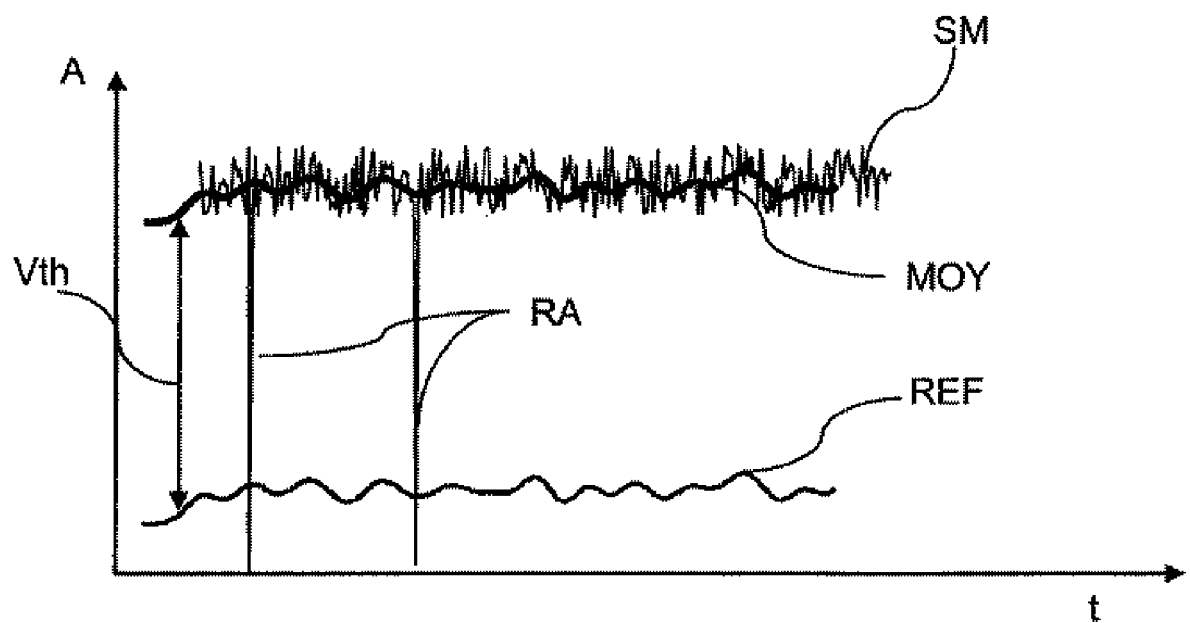

a. producing a measurement signal linked to the crankshaft travel time by supplying a succession of instantaneous values each corresponding to the difference between two successive segment times, each of these segment times corresponding to the time interval separating two characteristic instants of the movement of the pistons in two successive cylinders in the firing order, b. comparing the value of the measurement signal with a threshold value, and c. generating a signal representative of a misfire if the value of the measurement signal crosses the threshold value, the measurement signal having, for each cylinder, an average value that is offset relative to a reference average value, a step of reducing, for each cylinder, this offset, is performed by a high-pass filtering operation on the measurement signal.

15 Claims, 2 Drawing Sheets

U.S. PATENT DOCUMENTS

| | | | |
|---|---|---|---|
| 6,494,087 B2 * | 12/2002 | Hatano et al. | 73/114.02 |
| 6,885,932 B2 * | 4/2005 | Liu et al. | 701/103 |
| 7,359,793 B2 * | 4/2008 | Galtier et al. | 701/111 |
| 7,461,545 B2 * | 12/2008 | Gardiner | 73/114.02 |
| 7,591,172 B2 * | 9/2009 | Lynch et al. | 73/114.05 |
| 2006/0089782 A1 | 4/2006 | Galtier et al. | |

FOREIGN PATENT DOCUMENTS

| | | |
|---|---|---|
| DE | 19544720 | 3/1997 |
| DE | 19641916 | 4/1998 |
| WO | 9603630 | 2/1996 |
| WO | 2004046678 | 6/2004 |

* cited by examiner

METHOD FOR DETECTING A MISFIRE AND CORRESPONDING DEVICE

The present invention relates to the field of the detection of misfires. It applies in particular to multiple-cylinder internal combustion engines.

The current internal combustion engines are equipped with an engine control unit (ECU), a crankshaft and a device that makes it possible to know the angular position of the crankshaft when the motor is running.

The engine control unit makes it possible in particular to regulate the injection and the ignition (for a motor with controlled ignition) in each cylinder when the motor is running.

Knowing the angular position makes it possible to determine the position of the pistons in the respective cylinders and know the state of the cycle of the four-strokes engine (induction, compression, ignition-expansion, emission).

One usual means for producing the device making it possible to know the angular position of the crankshaft is to provide said crankshaft, joined to the movement of the pistons, with a target provided with identifiers (mechanical, optical, magnetic, etc.) passing in front of an associated detector element (sensor).

At the current time, a conventional crankshaft target comprises 60 identical and equidistant teeth, and, under the effect of the rotation of the crankshaft, the passage of the teeth in front of the associated sensor generates a signal representative of the displacement of the crankshaft called "crankshaft signal". The crankshaft signal is a signal, the instantaneous frequency of which is a function of the instantaneous speed of rotation of the crankshaft. In a conventional configuration, the crankshaft signal is a squarewave signal, periodic at constant speed, and nonperiodic in the acceleration or deceleration phase.

More specifically, the invention relates, according to one of its first aspects, to a method of detecting a misfire in an internal combustion engine provided with at least two cylinders and a crankshaft, this method comprising the steps consisting in:

a. producing a measurement signal linked to the crankshaft travel time,
b. comparing the value of the measurement signal with a threshold value, and
c. generating a signal representative of a misfire if the value of the measurement signal crosses the threshold value.

A misfire is an "power-stroke" phase of the cycle of the engine during which the ignition is performed badly or not at all.

When misfire occurs in a cylinder, the main effects are:
a drop in the internal pressure of said cylinder compared to that usually expected,
a fluctuation of the speed of rotation of the crankshaft, which is a consequence of the preceding point (indeed, although this phenomenon is damped by the inertial masses of the crankshaft, when misfire occurs, the latter generates a transient variation in the speed of rotation of the crankshaft),
an increase in the engine pollution (unburnt hydrocarbons, CO, NOx),
and, when a vehicle is equipped with a catalytic converter, the latter can also suffer more or less serious deterioration.

Conventionally, the detection of the presence of misfires can be performed by very precisely monitoring the speed of rotation, and the rotation speed disturbances, of the target joined to the crankshaft.

To this end, those skilled in the art know the teachings of the prior art document U.S. Pat. No. 5,670,713. This document describes a device for recognizing misfiring for multiple-cylinder internal combustion engines, and comprising at least two sensors, one of which is configured to generate a reference signal for each predetermined angle of rotation of the crankshaft.

The presence or absence of misfire is determined in each cylinder by measuring, in the reference signal, the period of time needed to accomplish a rotation by an angle of a value equal to that of the predetermined angle.

However, the solution described in this document U.S. Pat. No. 5,670,713 also comprises first correction means that are relatively complex, and requires a learning step that is costly in terms of memory resources, and requires particular means such as, for example, shift registers.

The aim of the present invention is to remedy these drawbacks by proposing a solution that is particularly simple to implement.

With this objective in view, the method according to the invention, conforming to the abovementioned preamble, is mainly characterized in that:

the step for producing the measurement signal is performed by supplying a succession of instantaneous values each corresponding to the difference between two successive segment times, each of these segment times corresponding to the time interval separating two characteristic instants of the movement of the pistons in two successive cylinders in the firing order,
said measurement signal having, for each cylinder, an average value that is offset relative to a reference average value,
the method also comprising a step consisting in reducing, for each cylinder, this offset.

Preferably, the reduction step is performed by a filtering operation on the measurement signal.

In one embodiment, the filtering operation depends on measured and/or calculated operating parameters of the engine.

Preferably, the operating parameters of the engine are its speed and its load.

In one embodiment, the filtering is performed by calculating a difference between a rolling average of the measurement signal and the instantaneous value of said measurement signal.

Preferably, the number of successive instantaneous values used to calculate the rolling average depends on measured and/or calculated operating parameters of the engine.

Advantageously in this embodiment, the operating parameters of the engine are its speed and its load.

Preferably, regardless of the embodiment, the threshold value is made dependent on the speed and the load of the engine.

The invention also relates to a device for detecting a misfire for an internal combustion engine provided with at least two cylinders and a crankshaft, that can implement the method as described before and comprising:

a. means for measuring the crankshaft travel time,
b. means for comparing the value of the measurement signal with a threshold value, and
c. means for generating a signal representative of a misfire if the value of the measurement signal crosses the threshold value.

This device is mainly characterized in that
the measurement signal is produced by supplying a succession of instantaneous values each corresponding to the difference between two successive segment times, each of these segment times corresponding to the time interval separating two characteristic instants of the movement of the pistons in two successive cylinders in the firing order, said measurement signal having, for each cylinder, an average value that is offset relative to a reference average value, the device also comprising means for reducing, for each cylinder, this offset.

Preferably, the offset reduction means comprise a low-pass filter, of which the value of the filtered measurement signal is removed from the non-filtered measurement signal.

Advantageously, the device according to the invention comprises means of calculating a difference between a rolling average of the measurement signal and the instantaneous value of said measurement signal.

Preferably, the device according to the invention also comprises a memory in which the threshold value is a previously stored variable that can be updated according to the speed and the load of the engine.

Figure 4:
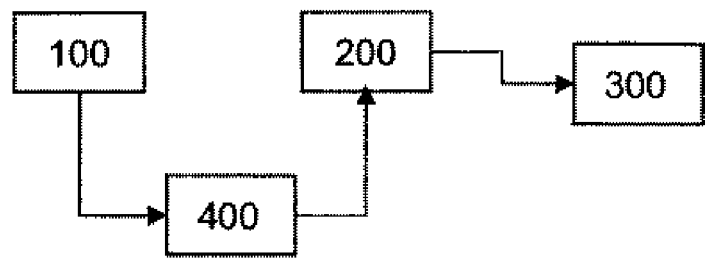
Figure 3:
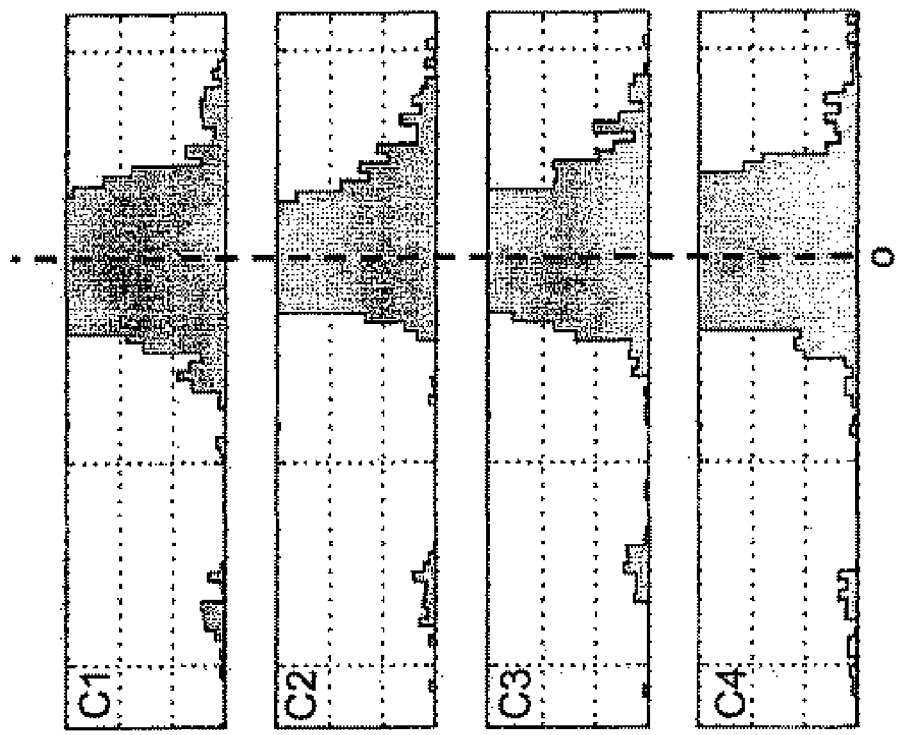
Figure 2:
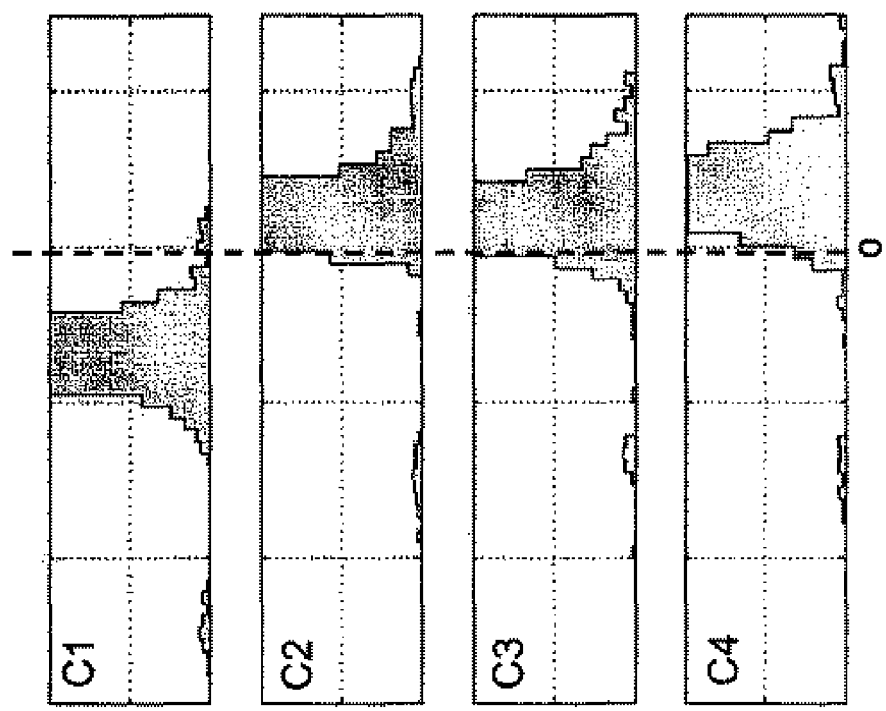

Other characteristics and advantages of the present invention will become more obvious from reading the following description given by way of illustrative and nonlimiting example and with reference to the appended drawings in which:

FIG. 1 illustrates two misfires on a measurement signal,

FIG. 2 is a diagrammatic representation (histogram) of the distribution of the segment times as directly measured for each of the four cylinders of an internal combustion engine, FIG. 3 is a diagrammatic representation (histogram) of the distribution of the segment times for each cylinder of FIG. 2, once the signal has been processed by a method according to the invention, and FIG. 4 is a diagrammatic representation of the device according to the invention.

The causes of a misfire can be as follows:

an ignition problem properly speaking, for example because of a clogged or elderly spark plug, an injection problem, for example because of an injection valve defect, a mechanical problem, for example because of a compression problem, blocked valve, etc.

The present invention is based on measuring the angular speed of the crankshaft, performed on each cylinder in turn.

Indeed, a cylinder that suffers a misfire transfers less energy to the crankshaft than the surrounding cylinders. A misfire, or mis-burning, therefore involves a temporary variation (temporary and sudden drop) in the speed of rotation of the crankshaft.

In order to detect misfiring according to the invention, a certain number of segments are defined in order to measure the corresponding segment times.

Preferably, misfiring detection is synchronized with the ignition and is based, according to the invention, on the detection and comparison of the segment times.

A segment is an angular region of the crankshaft rotation. The segment time is the travel time by the crankshaft of said segment.

More specifically, a segment is an angular period, that is, a segment is defined by the angle separating two reference positions of two successive pistons in the firing order. This angular region corresponds to a specific movement of the pistons in their respective cylinder.

Now, in a cylinder, a piston travels a reciprocating path passing through two characteristic points: the top dead center (TDC) and the bottom dead center (BDC). These two characteristic points can therefore advantageously be used as reference points for defining segments.

To this end, the time separating two successive top dead points of two successive pistons in the firing order can, for example, define a segment time.

The segment time in which the crankshaft travels this angular region depends, among other parameters, on the energy converted in the "power stroke" phase. A misfire consequently increases the segment time.

For a multiple-cylinder engine with segments evenly distributed, the value in degrees of a segment is $SEG=720/N_c$, with $N_c$ being the number of cylinders.

Or $SEG=180°$ for a four-cylinder engine, $SEG=120°$ for a six-cylinder engine, and so on.

In one embodiment, the measurement of the segment times is performed at each top dead point.

In another embodiment, the position of the segments is offset relative to the reference position (top dead center/bottom dead center). For example, for a four-cylinder engine, the position of the segments can be such that the segment of each cylinder corresponds to an angular position of 180°, between 42° before the top dead point and 138° after the top dead point.

As an example, as illustrated in FIG. 1, a measurement signal SM is constructed from the time difference between two successive segments. Referring to FIG. 4, the means for measuring the travel time of the crankshaft 100 comprise a crankshaft sensor and its associated target.

FIG. 1 illustrates two misfires on a measurement signal, before implementing the invention.

The amplitude of the measurement signal SM is compared with a reference signal REF by means 200 for comparing the value of the measurement signal with a threshold value (FIG. 4). The reference signal comprises a threshold component Vth, the crossing of which can be interpreted as a misfire RA.

In one embodiment in which the invention is placed in the case where the speed of the vehicle is likened to a constant speed, the reference average value of the measurement signal should be equal to zero.

Now, because of the very construction of the engines, for example because of the intake and exhaust nozzles, all the cycles do not have the same ignition duration. This imbalance is not constant (it can vary according to the operating conditions of the engine in particular), and the result thereof is that the measurement signal suffers "natural" variations, the value of which can disturb the measurement signal, that is, the value of the measurement signal can approach that of the reference signal even though no misfire has occurred.

Because of this, the average value of the measurement signal is different from zero, that is, there is an offset between the real value and the theoretical value of the average of the measurement signal. This offset is illustrated in FIG. 2 for an engine with four cylinders, respectively named C1, C2, C3 and C4.

FIG. 2 is a histogram of the measured values of the segment times for each cylinder C1, C2, C3 and C4 of an internal combustion engine illustrating our proposal.

The bold broken line is the "ideal" average value of the average segment time.

It thus emerges that no histogram is centered about said "ideal" average value and that certain cylinders (C1 and C4 in particular) even depart greatly therefrom, making the detection of misfires (points placed on the left part of the histogram) difficult, even unrealistic and incorrect.

According to the invention, the problem of the offset for each cylinder is resolved by implementing means 400 configured to reduce said offset, notably by eliminating the low-frequency component of the measurement signal.

To this end, the measurement signal is processed by a high-pass filter so that only the high frequencies (in engine acceleration terms) corresponding to the misfires are extracted from the measurement signal.

In one embodiment, the filtering is performed by the permanent and continuous calculation of the rolling average of the measurement signal. This average is then subtracted from the instantaneous value of the measurement signal.

In another embodiment, the rolling average is calculated with a predetermined number of prior values of the measurement signal.

Furthermore, in another embodiment, the values of the measurement signal corresponding to a misfire are not taken into account in calculating the average.

Thanks to this configuration, the measurement signal is recentered at zero, as illustrated in FIG. 3. FIG. 3 represents the distribution of the segment times for each cylinder of FIG. 2, once the signal has been processed by a method according to the invention, for the same four-cylinder engine.

The filtered measurement signal is then compared with the reference signal. Exceeding the value of this reference signal is likened to a misfire, and an alarm signal can be generated to this end, by means 300 configured to generate a signal representative of a misfire if the value of the measurement signal crosses the threshold value.

Preferably, the value of the reference signal depends on the speed and the load of the engine.

The invention claimed is:

1. A method of detecting a misfire in an internal combustion engine provided with at least two cylinders and a crankshaft, this method comprising the steps of:
   a. producing a measurement signal linked to the crankshaft travel time by supplying a succession of instantaneous values each corresponding to the difference between two successive segment times, each of these segment times corresponding to the time interval separating two characteristic instants of the movement of the pistons in two successive cylinders in the firing order,
   b. comparing the value of the measurement signal with a threshold value, and
   c. generating a signal representative of a misfire if the value of the measurement signal crosses the threshold value,
   said measurement signal having, for each cylinder, an average value that is offset relative to a reference average value,
   the method also comprising a step consisting in reducing, for each cylinder, this offset,
   characterized in that the reduction step is performed by a high-pass filtering operation on the measurement signal.

2. The method as claimed in claim 1, wherein the filtering operation depends on measured and/or calculated operating parameters of the engine.

3. The method as claimed in claim 2, wherein the operating parameters of the engine are its speed and its load.

4. The method as claimed in claim 1, wherein the filtering is performed by calculating a difference between a rolling average of the measurement signal and the instantaneous value of said measurement signal.

5. The method as claimed in claim 4, wherein the number of successive instantaneous values used to calculate the rolling average depends on measured and/or calculated operating parameters of the engine.

6. The method as claimed in claim 5, wherein the operating parameters of the engine are its speed and its load.

7. The method as claimed in claim 1, wherein the threshold value is made dependent on the speed and the load of the engine.

8. A device for detecting a misfire for an internal combustion engine provided with at least two cylinders and a crankshaft, and comprising:
   a. means for measuring the crankshaft travel time, supplying a succession of instantaneous values each corresponding to the difference between two successive segment times, each of these segment times corresponding to the time interval separating two characteristic instants of the movement of the pistons in two successive cylinders in the firing order,
   b. means for comparing the value of the measurement signal with a threshold value, and
   c. means for generating a signal representative of a misfire if the value of the measurement signal crosses the threshold value,
   said measurement signal having, for each cylinder, an average value that is offset relative to a reference average value,
   the device also comprising means for reducing, for each cylinder, this offset,
   characterized in that the offset reduction means comprise means applying a high-pass filtering function.

9. The device as claimed in claim 8, wherein the offset reduction means comprise a low-pass filter, of which the value of the filtered measurement signal is removed from the non-filtered measurement signal.

10. The device as claimed in claim 9, comprising means for calculating a difference between a rolling average of the measurement signal and the instantaneous value of said measurement signal.

11. The device as claimed in claim 10, also comprising a memory in which the threshold value is a previously stored variable that can be updated according to the speed and the load of the engine.

12. The device as claimed in claim 9, also comprising a memory in which the threshold value is a previously stored variable that can be updated according to the speed and the load of the engine.

13. The device as claimed in claim 8, comprising means for calculating a difference between a rolling average of the measurement signal and the instantaneous value of said measurement signal.

14. The device as claimed in claim 13, also comprising a memory in which the threshold value is a previously stored variable that can be updated according to the speed and the load of the engine.

15. The device as claimed in claim 8, also comprising a memory in which the threshold value is a previously stored variable that can be updated according to the speed and the load of the engine.

* * * * *